(12) United States Patent
Ho et al.

(10) Patent No.: US 8,025,429 B2
(45) Date of Patent: Sep. 27, 2011

(54) LED ILLUMINATION LENS

(76) Inventors: Yen-Wei Ho, Taichung (TW); Pei-Wen Ko, Taichung (TW)

( * ) Notice: Subject to any disclaimer, the term of this patent is extended or adjusted under 35 U.S.C. 154(b) by 140 days.

(21) Appl. No.: 12/453,640

(22) Filed: May 18, 2009

(65) Prior Publication Data

US 2010/0232166 A1 Sep. 16, 2010

(30) Foreign Application Priority Data

Mar. 13, 2009 (TW) ................................ 98108328 A

(51) Int. Cl.
*F21V 3/00* (2006.01)
*F21V 5/00* (2006.01)

(52) U.S. Cl. .............. 362/311.02; 362/311.08; 362/335; 257/98

(58) Field of Classification Search ................... 362/326, 362/335, 244, 311.02, 311.08; 359/708, 359/718; 257/98

See application file for complete search history.

(56) References Cited

U.S. PATENT DOCUMENTS 5,933,276 A * 8/1999 Magee .......................... 359/455
2008/0088770 A1* 4/2008 Hwang et al. ................. 362/335
* cited by examiner

*Primary Examiner* — Stephen F Husar
(74) *Attorney, Agent, or Firm* — Raymond Y. Chan; David and Raymond Patent Firm

(57) ABSTRACT

An LED illumination lens can guide light from light emitting diodes (LEDs). The incident surface and transmission surface of the lens are a part of an elliptical shape. The present invention makes an optical lens which provides that light is refracted twice by the LED illumination lens, and the output light is more uniform and present a long elliptical output light. The curve surface of the transmission surface is selected from elliptical surfaces, rectangular surfaces, square shape surfaces, round surfaces and rectangular surfaces with a cut corner, and polygonal surfaces. An LED illumination lens serves to refract the light beam from the LED by the incident surface and then disperse by the transmission surface 12 into a slender and long elliptical light beam.

12 Claims, 18 Drawing Sheets

FWHM = 40°-80°

FWHM = 10°-35°

LED ILLUMINATION LENS

FIELD OF THE INVENTION

The present invention relates to LED illumination lens, in particular to an LED illumination lens which can guide light from light emitting diodes (LEDs). The incident surface and transmission surface of the lens are a part of an elliptical shape. The present invention makes an optical lens which provides that light is refracted twice by the LED illumination lens, and the output light is more uniform has present a long elliptical output light.

BACKGROUND OF THE INVENTION

Recently, the demand for power saving, environmental protected, small sized, high core purity, concrete light emission diode with long lifetime is increased. High power LED catches more and more attentions and thus more products are produced. However the lens in the prior art LED modules keeps emphasis at the output light uniform to cause the light to refract in an effective light output range. The light angle distribution has round shapes viewing from the optical axis.

However the above-mentioned lens can not match the condition that the concentration or compensation of the light output at different angle or different direction based on the difference of the position after the light emission diodes are arranged as an array so that the light at the periphery of the array is weak and the center portion is strong due to overlapping effect.

Thus, the present invention makes an optical lens which provides that light is refracted twice by the LED illumination lens, and the output light is more uniform has present a long elliptical output light.

SUMMARY OF THE INVENTION

The object of the present invention is to provide an LED illumination lens. When light is refracted twice by the LED illumination lens, the output light is more uniform and present a long elliptical output light.

The various objects and advantages of the present invention will be more readily understood from the following detailed description when read in conjunction with the appended drawing.

DETAILED DESCRIPTION OF THE INVENTION

Figure 1:
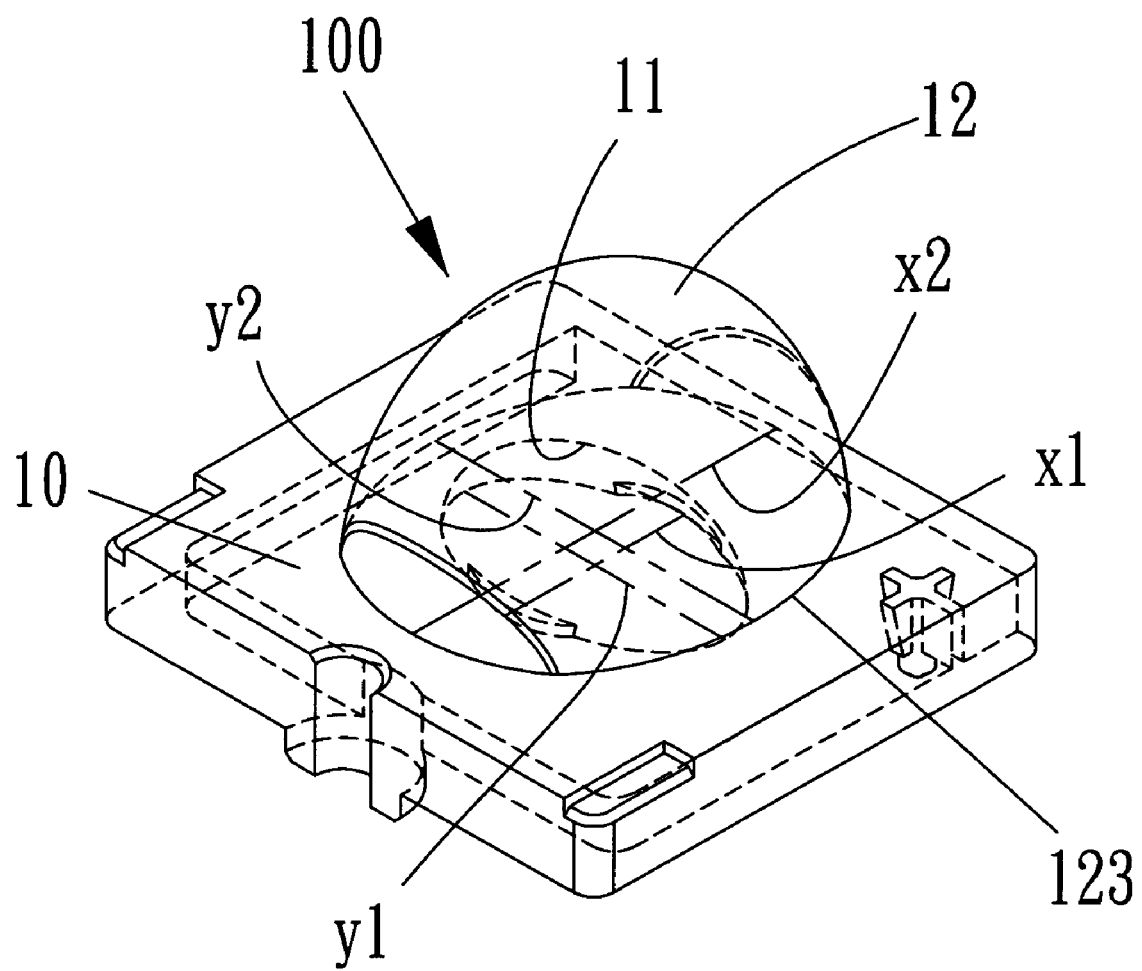
FIG. 1 is a perspective view of a preferred embodiment of the present invention.
Figure 2:
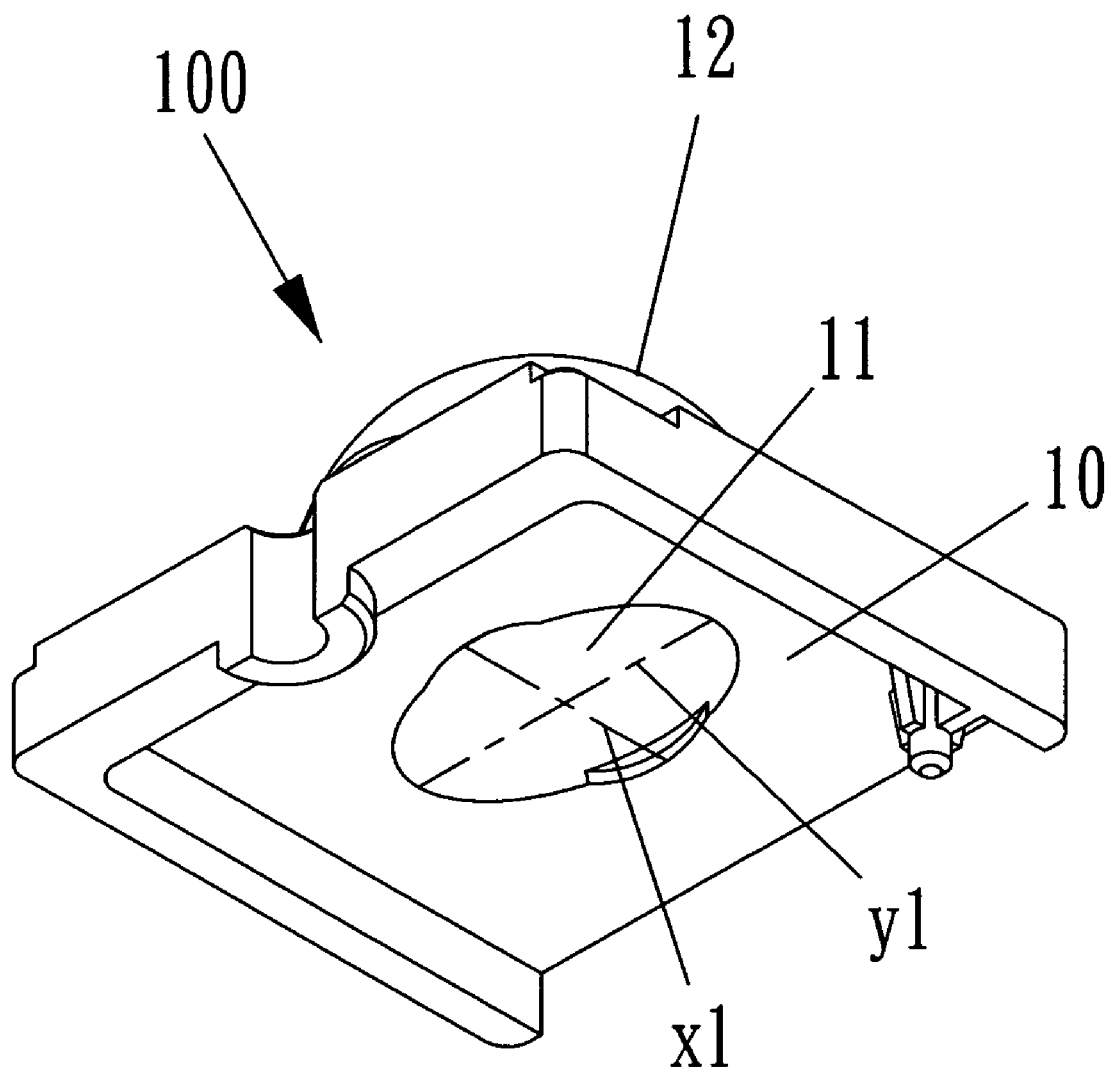
FIG. 2 is an elevational view of the preferred embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 8, the LED illumination lens 100 of the present invention is illustrated. The lens has the following elements.

A platform 10 has an incident surface 11 and a transmission surface 12 opposite to the incident surface 11. The incident surface 11 will refract a light beam from a light emission diode 20.

The incident surface 11 and the transmission surface 12 satisfy the following condition.

Figure 3:
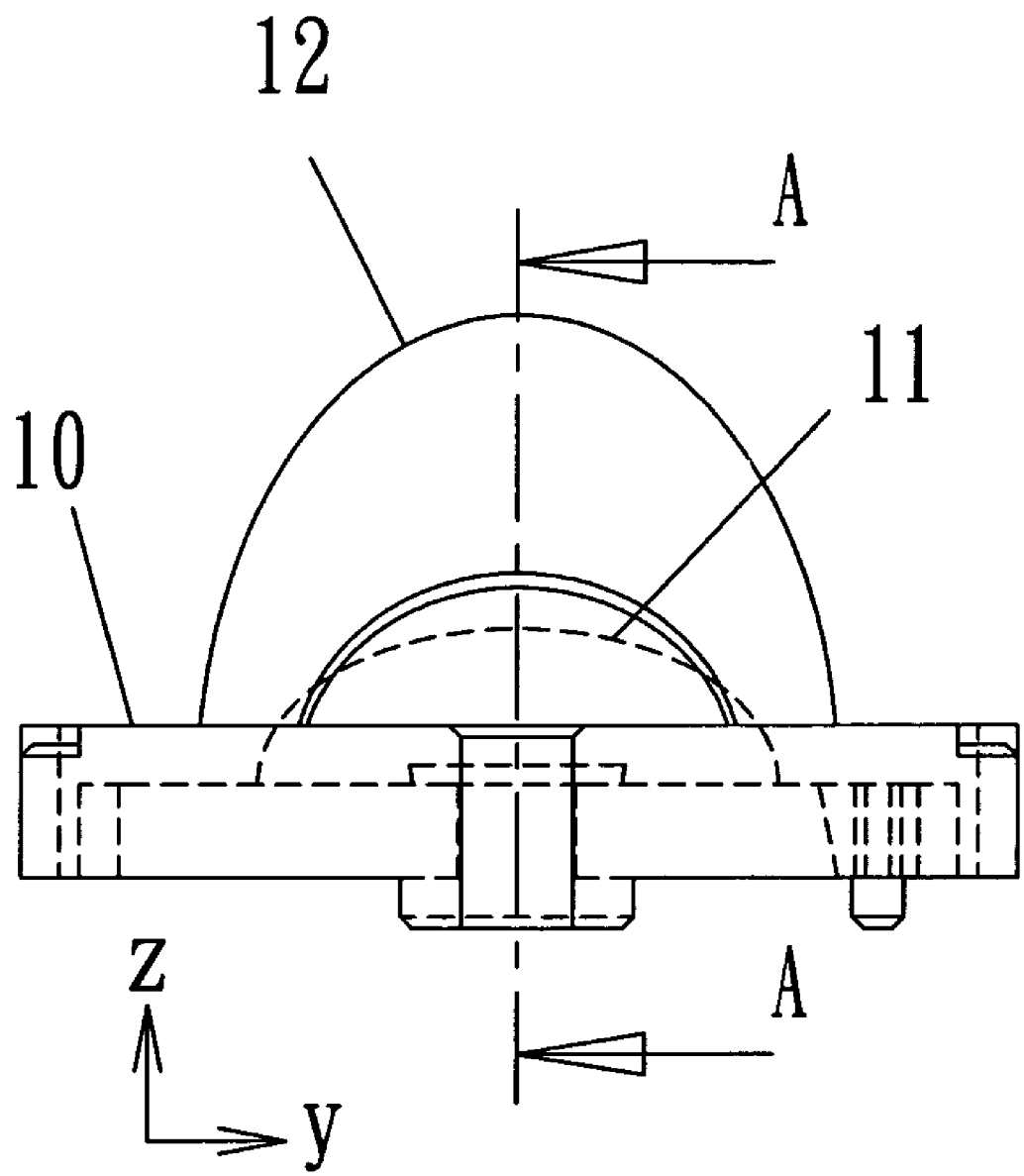
FIG. 3 is a front view of the preferred embodiment of the present invention.
Figure 4:
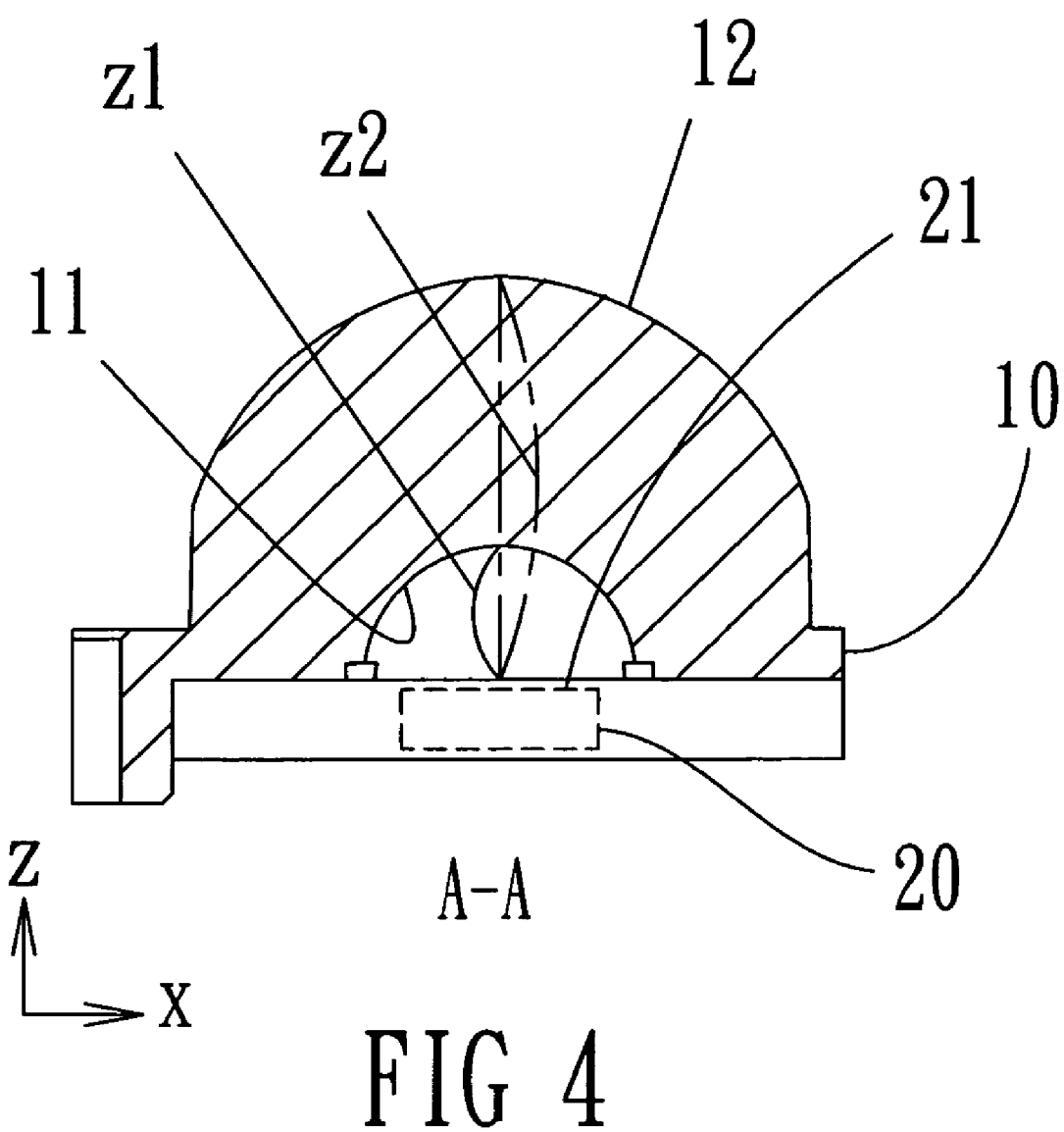
FIG. 4 is a cross sectional view along line A-A based on the preferred embodiment of the present invention.
Figure 5:
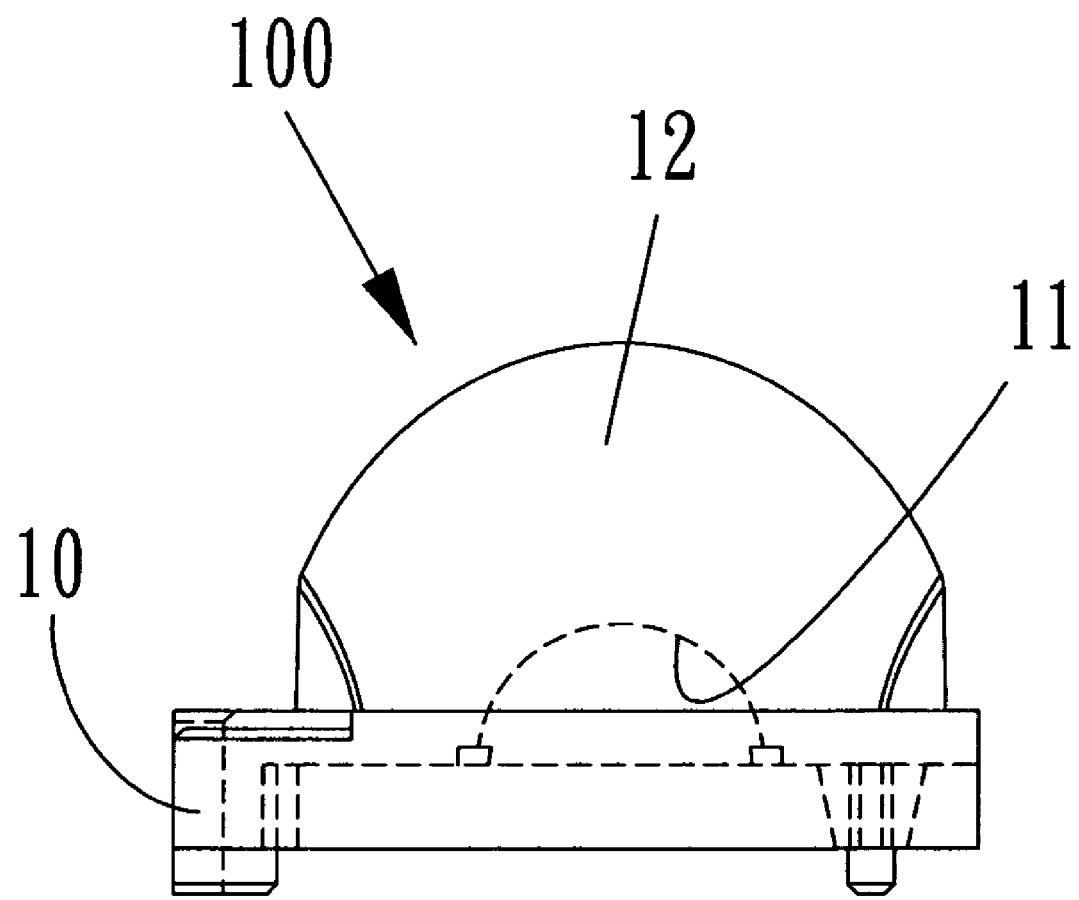
FIG. 5 is a lateral view of the preferred embodiment of the present invention.
Figure 6:
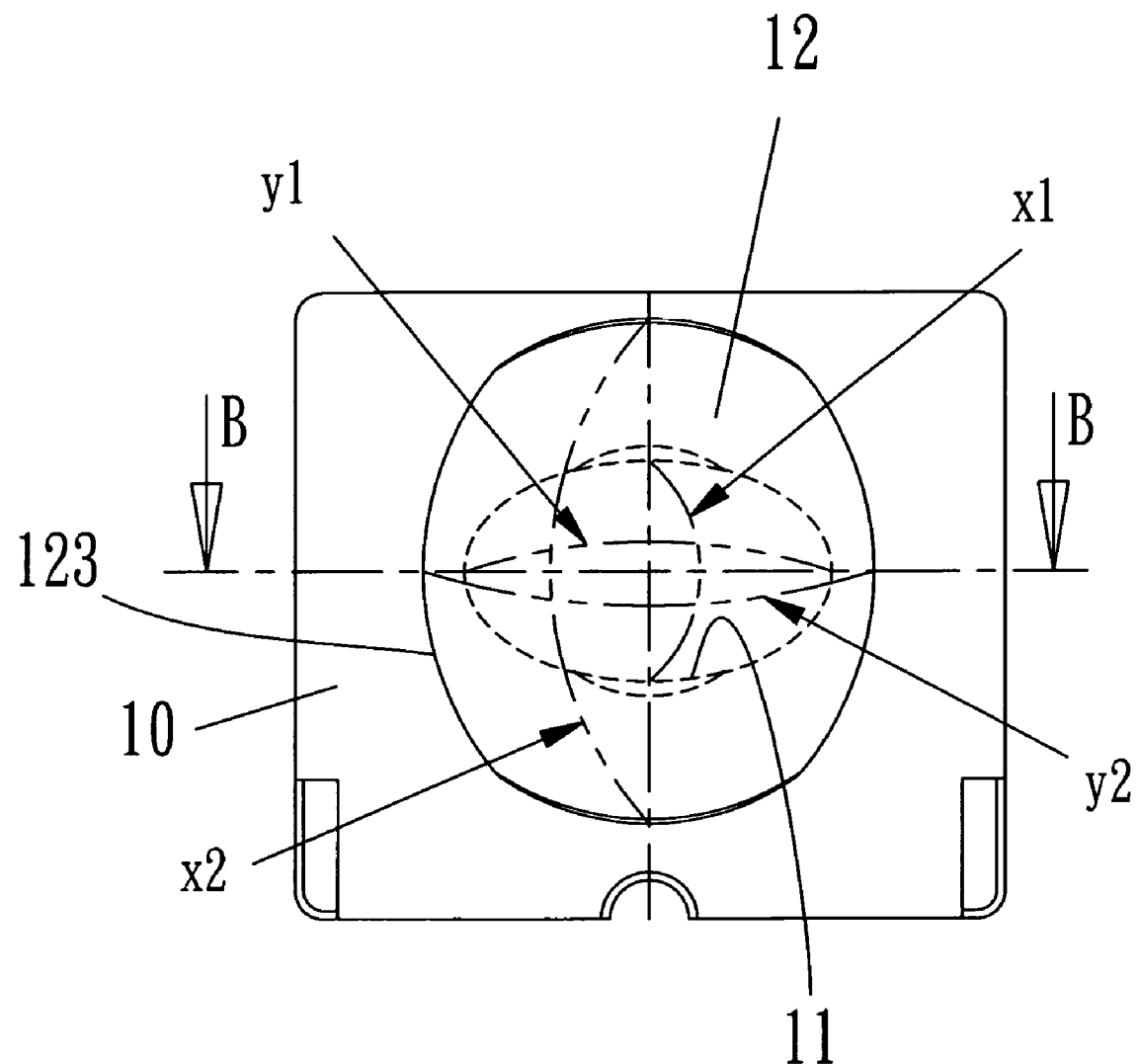
FIG. 6 is an elevation view of the preferred embodiment of the present invention.

The incident surface 11 is a concave curved surface. The concave curved surface is a part of an elliptical surface. The elliptical sizes of the concave curved surface are: $x1, y1, z1$;

The transmission surface 12 is a convex curved surface which is a part of an elliptical surface. The elliptical sizes of the concave curved surface are: $x2, y2, z2$;

In that, $x1 < y1$; $y2 < x2$; 4 mm $< x1 <$ 8 mm; 8 mm $< x2 <$ 16 mm. FIGS. 4 and 5 are views from x-z plane and FIGS. 3 and 7 are views from y-z plane.

Figure 7:
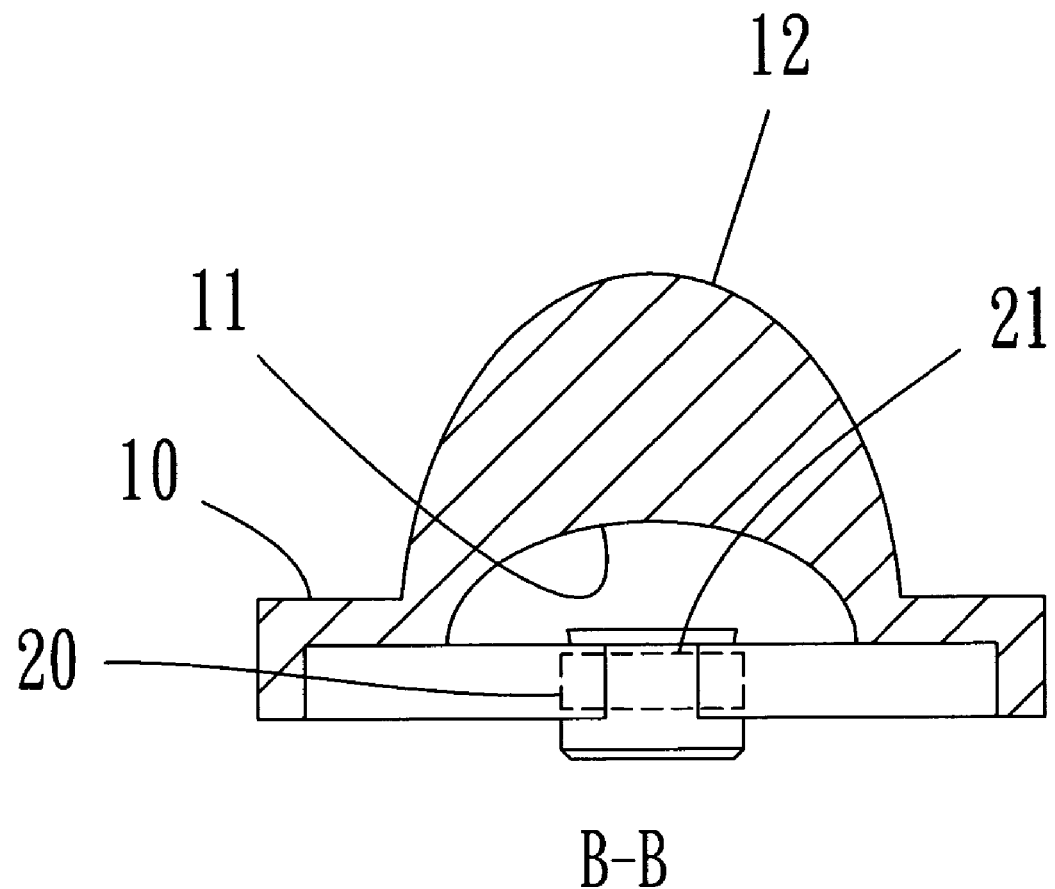
FIG. 7 is a cross sectional view along line B-B of the preferred embodiment of the present invention.
Figure 8:
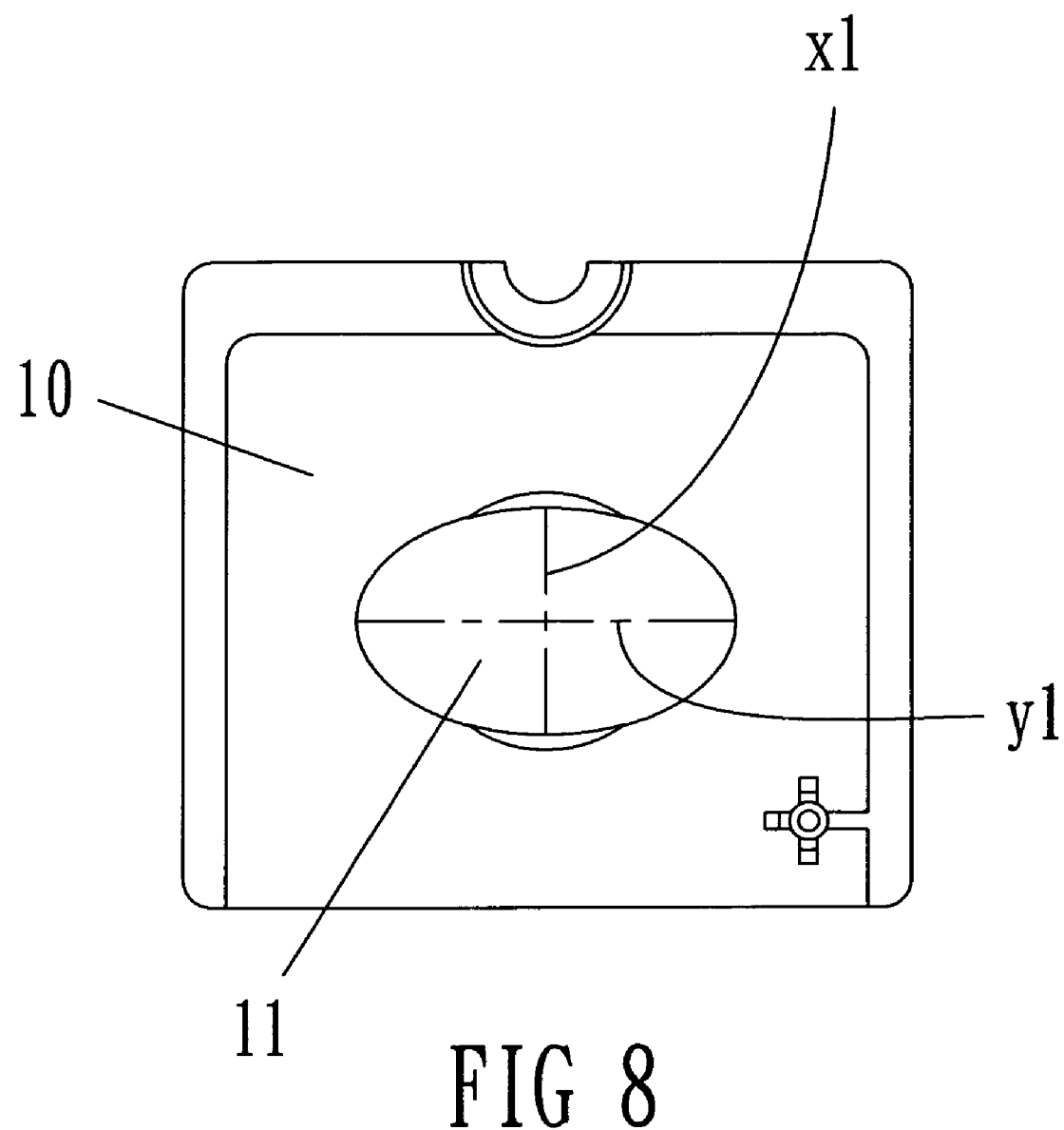
FIG. 8 is an elevational view of the preferred embodiment of the present invention.

As illustrated in FIGS. 4 and 7, when the incident surface 11 is installed at the light output side of the light emission diode 20, the light from the light emission diode 20 will enter into the optical lens of the incident surface 11. Thus the dispersed light at the edge side is refracted further and then is shifted to be out of an effective light output range to be out of the effect angle. Furthermore, light in a front face of the light emission diode 20 is dispersed. Light is refracted by the light transmission surface 12 which is as a part of the elliptical surface of the convex curved surface and thus the output light beam has a long and rod like shape.

Moreover, when the LED illumination lens 100 of the present invention is assembled to the light emission diode 20, the light emitting surface of the light emission diode 20 is installed at the original point of a coordinate and the LED illumination lens 100 satisfies the following condition:

A distance from the apex of an incident surface 11 and the light emitting surface 21 is between 3 mm to 6 mm. A distance between the apex of the transmission surface 12 and the light emitting surface 21 is between 3 mm to 12 mm.

Figure 9:
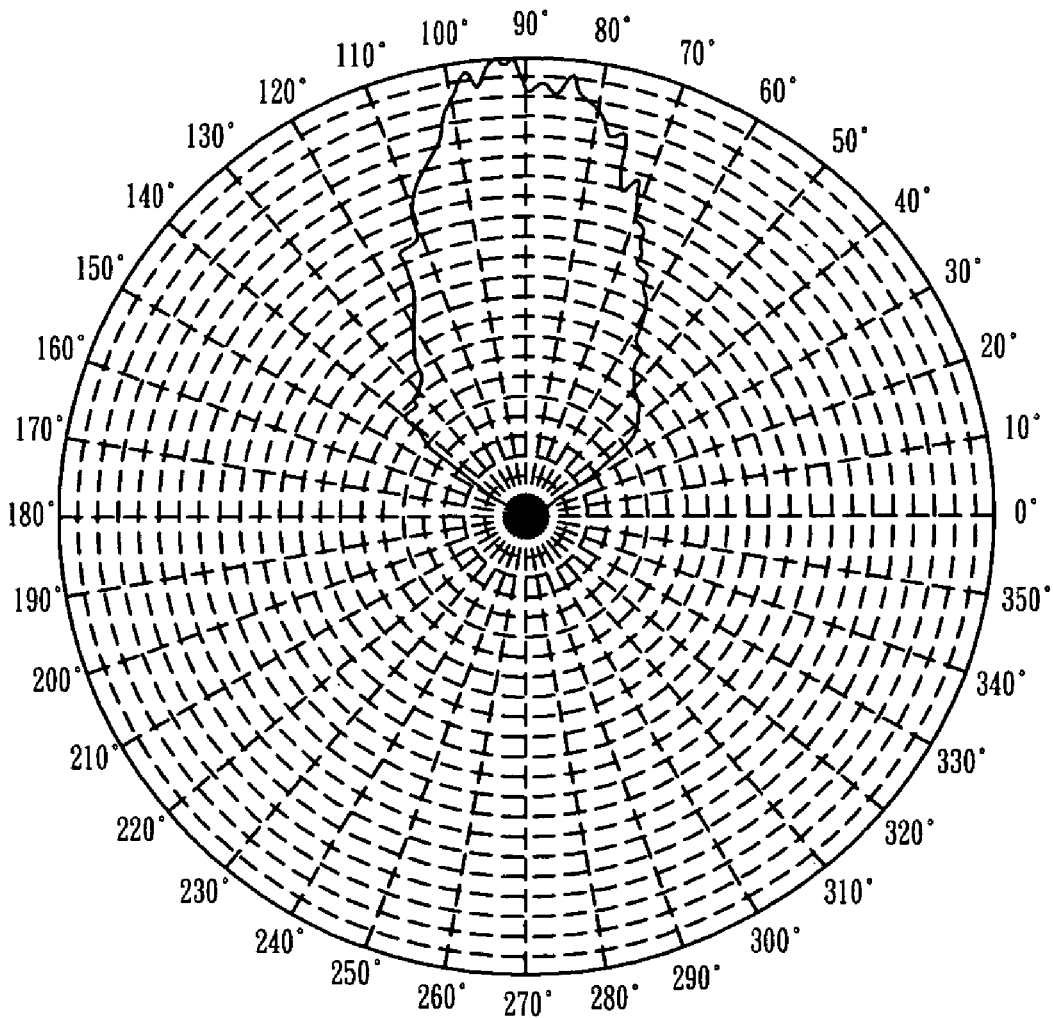
FIG. 9 shows the light strength distribution of the light emission diode with a FWHM between 40°-80° at a position with respect to the position shown in FIG. 4.
Figure 10:
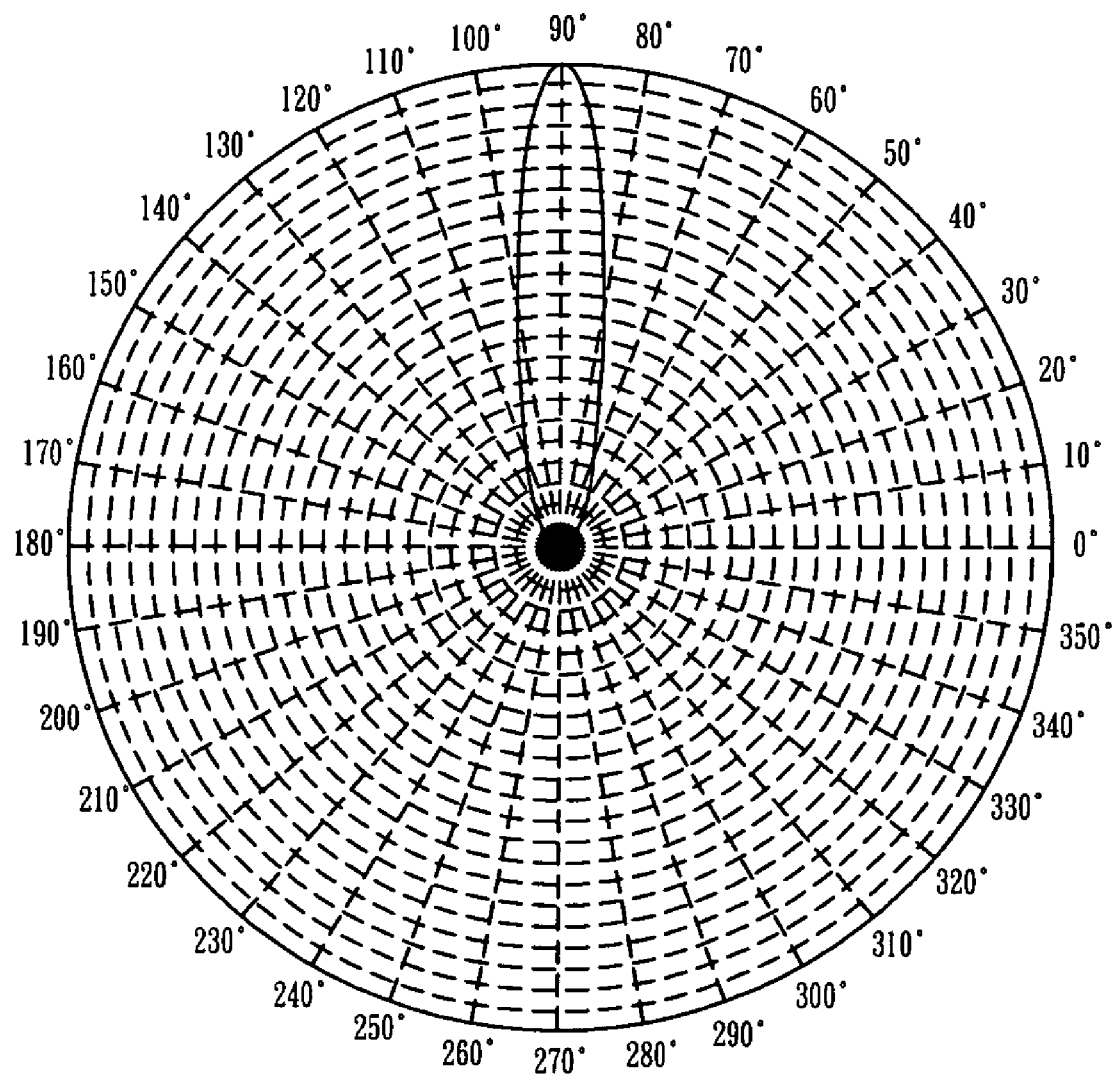
FIG. 10 shows the light strength distribution of the light emission diode with a FWHM between 10°-35° at a position with respect to the position shown in FIG. 7.

If above two conditions are satisfied, the LED illumination lens 100 of the present invention serves to refract the light beam from the LED 20 into a slender and long elliptical light beam. With reference to FIGS. 7 and 9, a front cross sectional view of the LED illumination lens 100 according to the present invention is illustrated. A simulation light strength distribution curve with respect to the position illustrated in the front cross sectional view is illustrated, where the strength in X cut surface has a large angle θ1. The angle is a FWHM, wherein θ1 is between 40° and 80°. Referring to FIGS. 4 and 10, an asymmetrical distribution of a lateral cross sectional view of the LED illumination lens 100 is illustrated and a simulation light strength distribution curve with respect to the position illustrated in the lateral cross sectional view is illustrated, where the strength in X cut surface has a small angle θ1. The angle is a FWHM, wherein θ1 is between 10° and 35°. Thereby, by fine-turning the angle relation of the light emission diode with respect to the illumination lens, the ration of the θ1 and θ2 is changeable.

Above-mentioned are the structure of the LED illumination lens according to the present invention. The light strength distributions at different positions are also shown. In the feature, under the condition that the lens platform 10 is retained at a position satisfied the requirement of the incident surface 11, that is, the transmission surface 12 is a part of an elliptical surface, the outline of the curved surface may be one of an elliptical shape 123, a square shape 124, a rectangular shape 125, a round shape 126, a square shape with a cut angle 127, or a polygonal shape.

Figure 11:
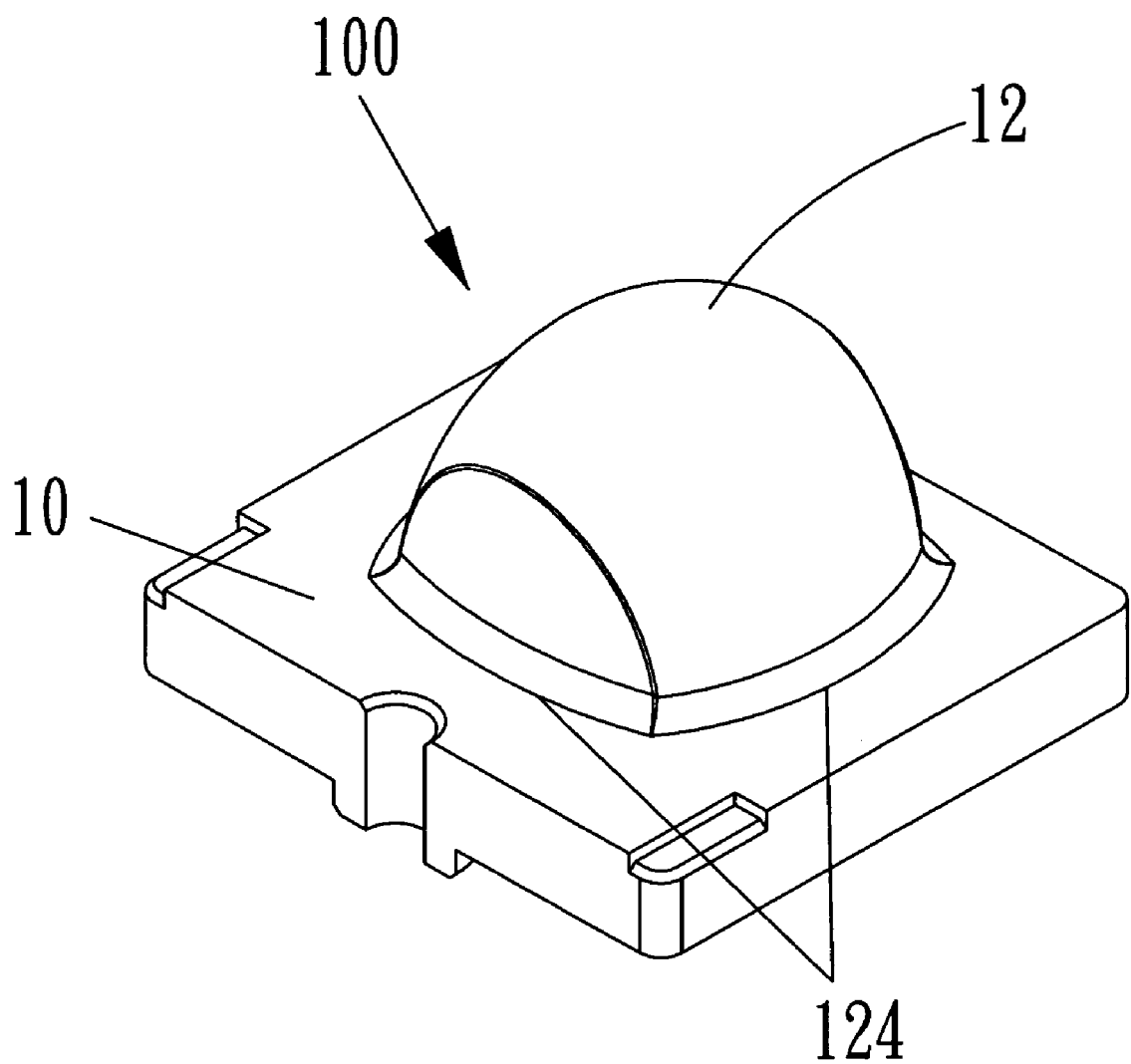
FIG. 11 is a perspective view of the second preferred embodiment of the present invention.
Figure 12:
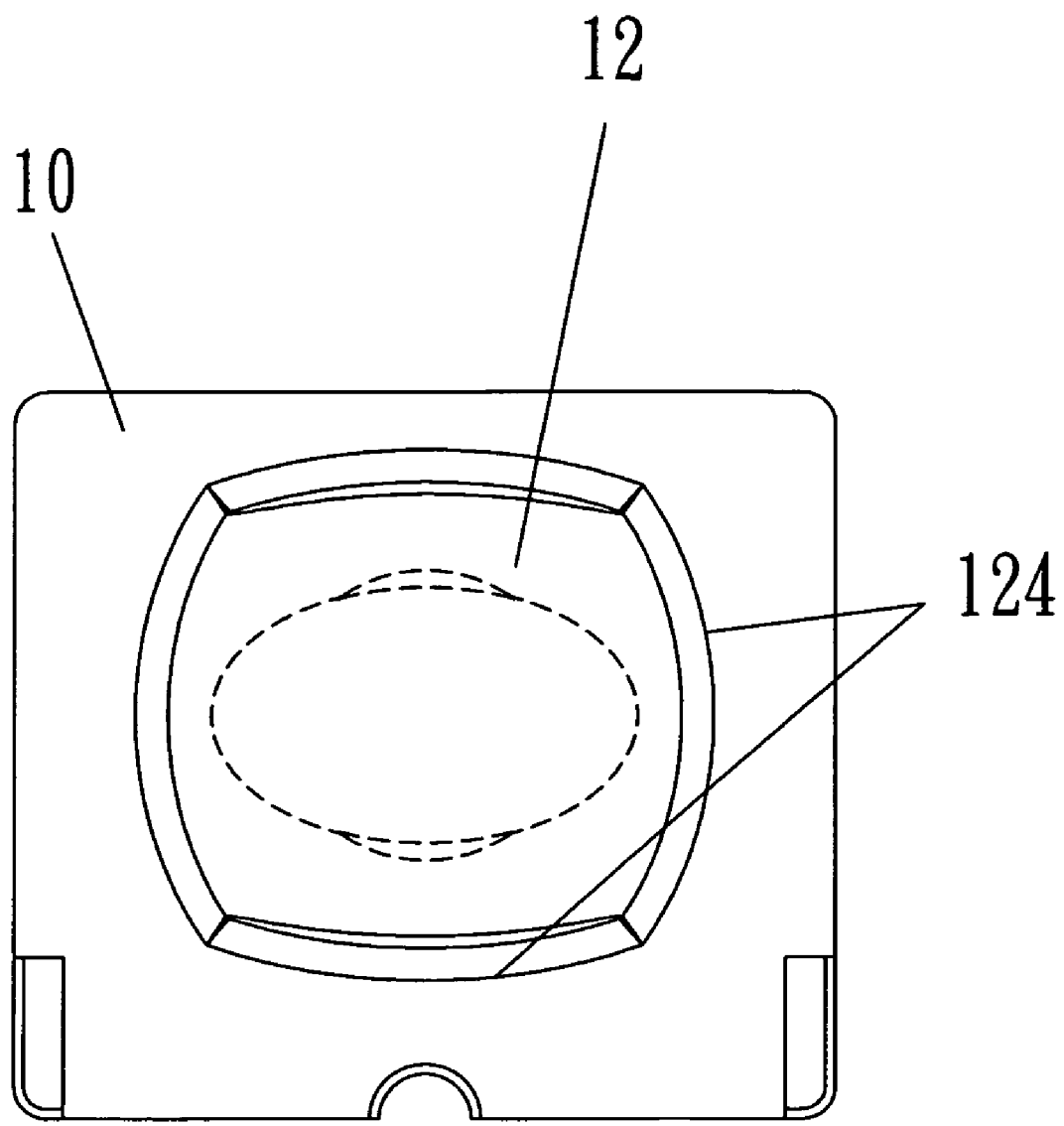
FIG. 12 is an elevational view of the second preferred embodiment of the present invention.

Referring to FIGS. 11 and 12, the front view of elevation view about the second embodiment of the LED illumination lens are illustrated, in that the outline of the curved surface of the transmission surface 12 is a square shape 124.

Figure 13:
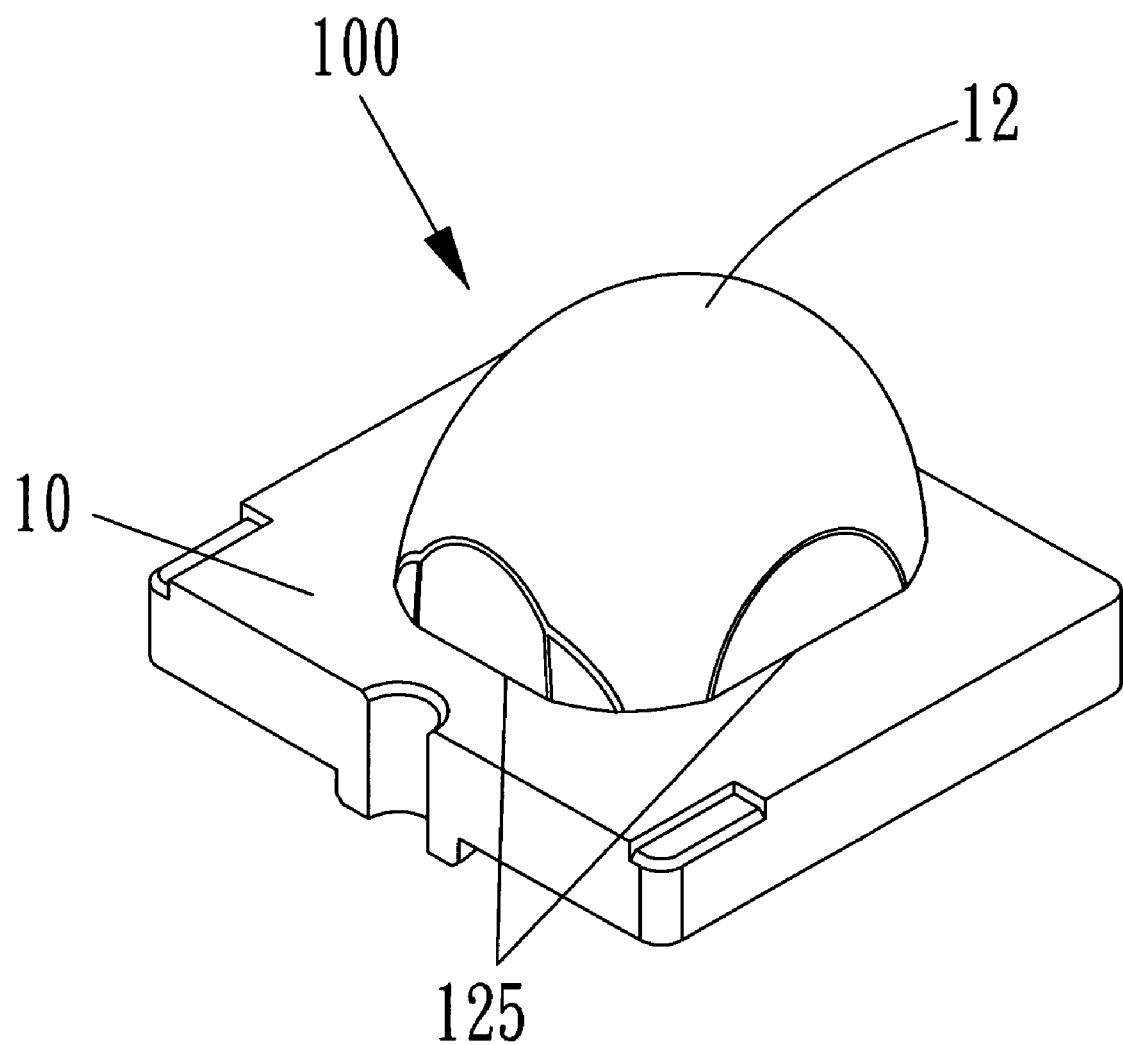
FIG. 13 is a perspective view of the third preferred embodiment of the present invention.
Figure 14:
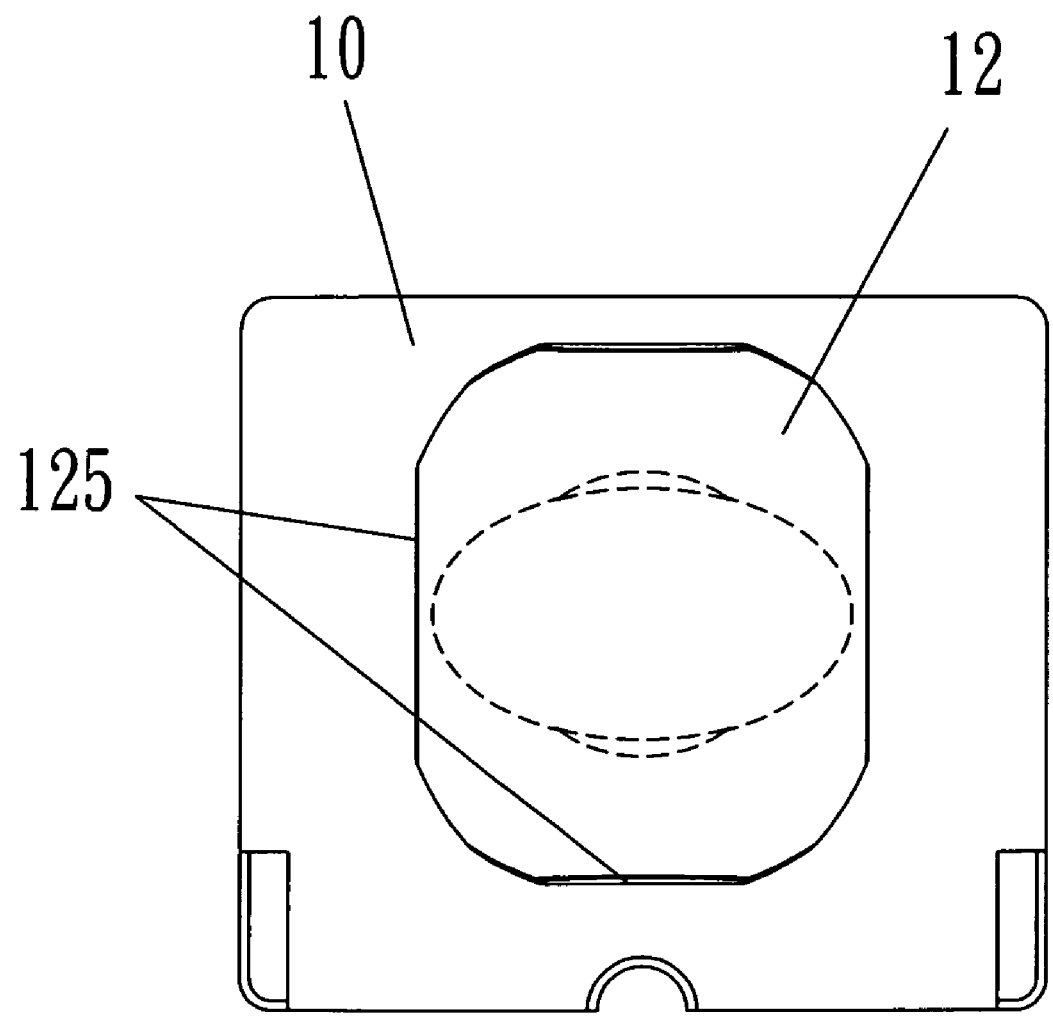
FIG. 14 is an elevational view of the third preferred embodiment of the present invention.

Referring to FIGS. 13 and 14, the front view of elevation view about the third embodiment of the LED illumination lens are illustrated, in that the outline of the curved surface of the transmission surface 12 is a rectangular shape 125.

Figure 15:
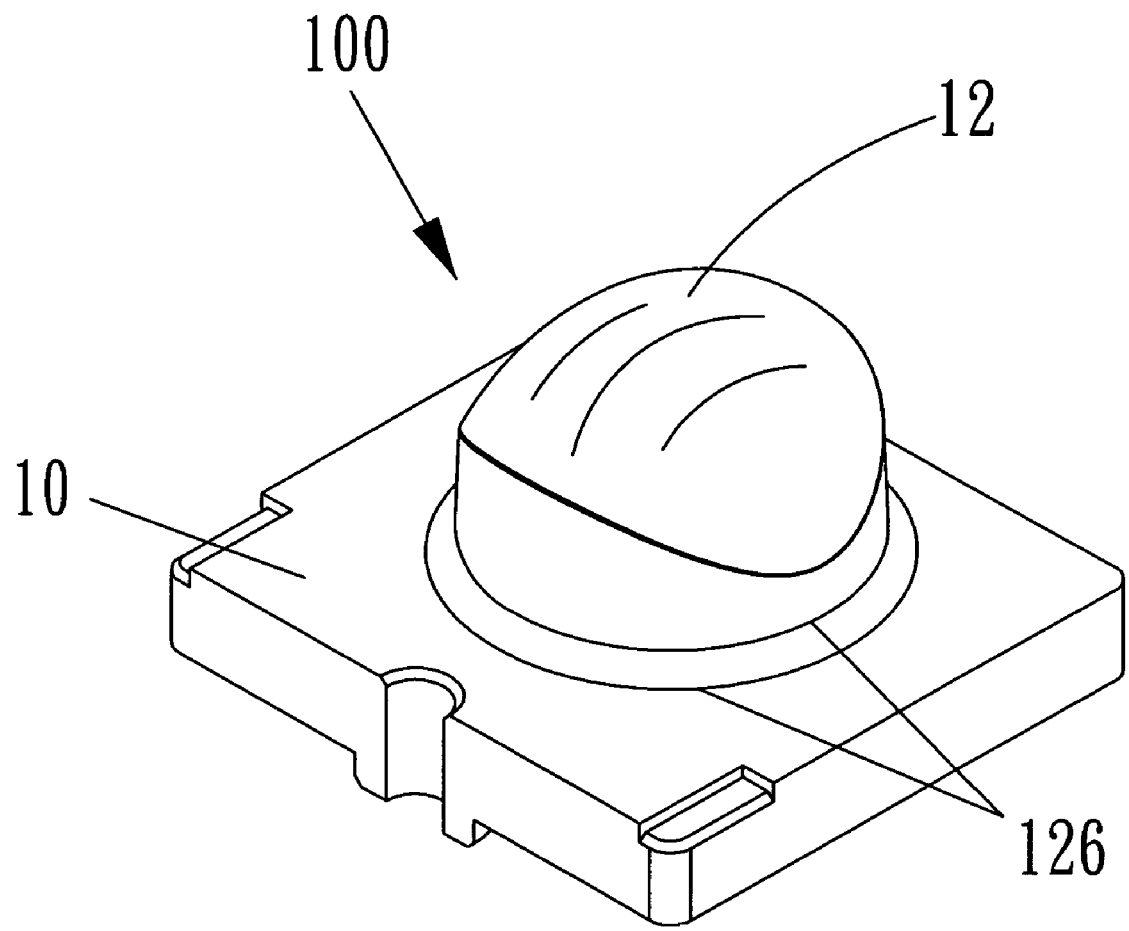
FIG. 15 is a perspective view of the fourth preferred embodiment of the present invention.
Figure 16:
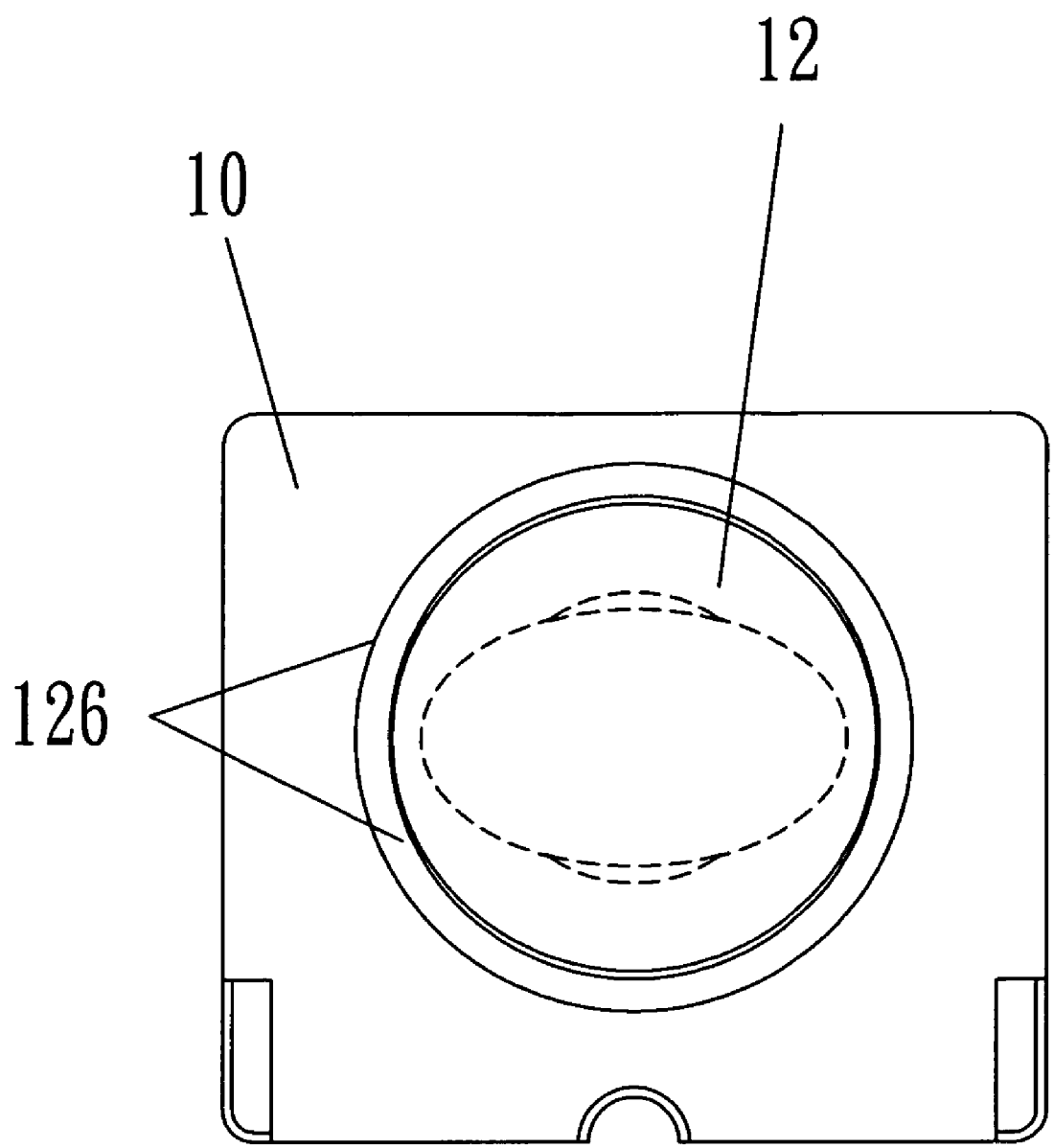
FIG. 16 is an elevational view of the fourth preferred embodiment of the present invention.

Referring to FIGS. 15 and 16, the front view of elevation view about the fourth embodiment of the LED illumination lens are illustrated, in that the outline of the curved surface of the transmission surface 12 is a round shape 126.

Figure 17:
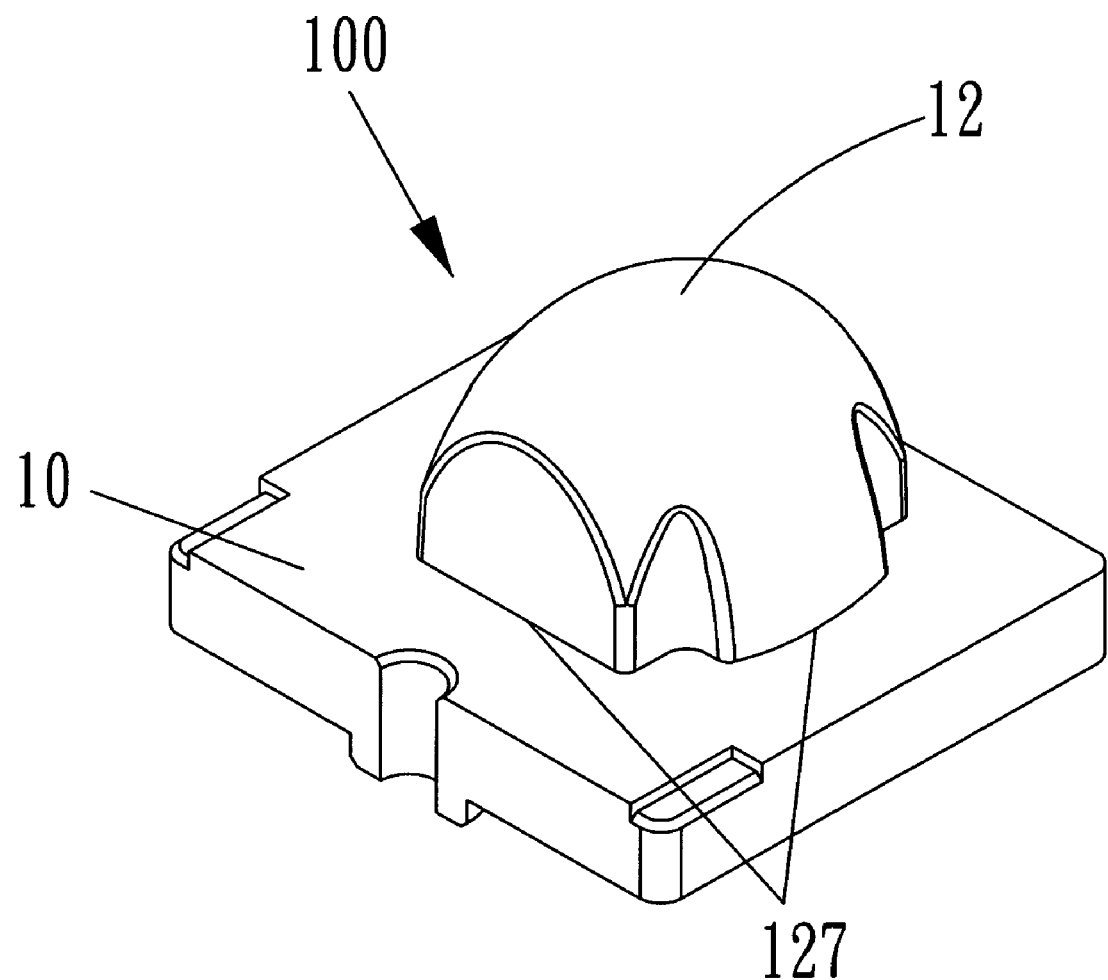
FIG. 17 is an elevational view of the fifth preferred embodiment of the present invention.
Figure 18:
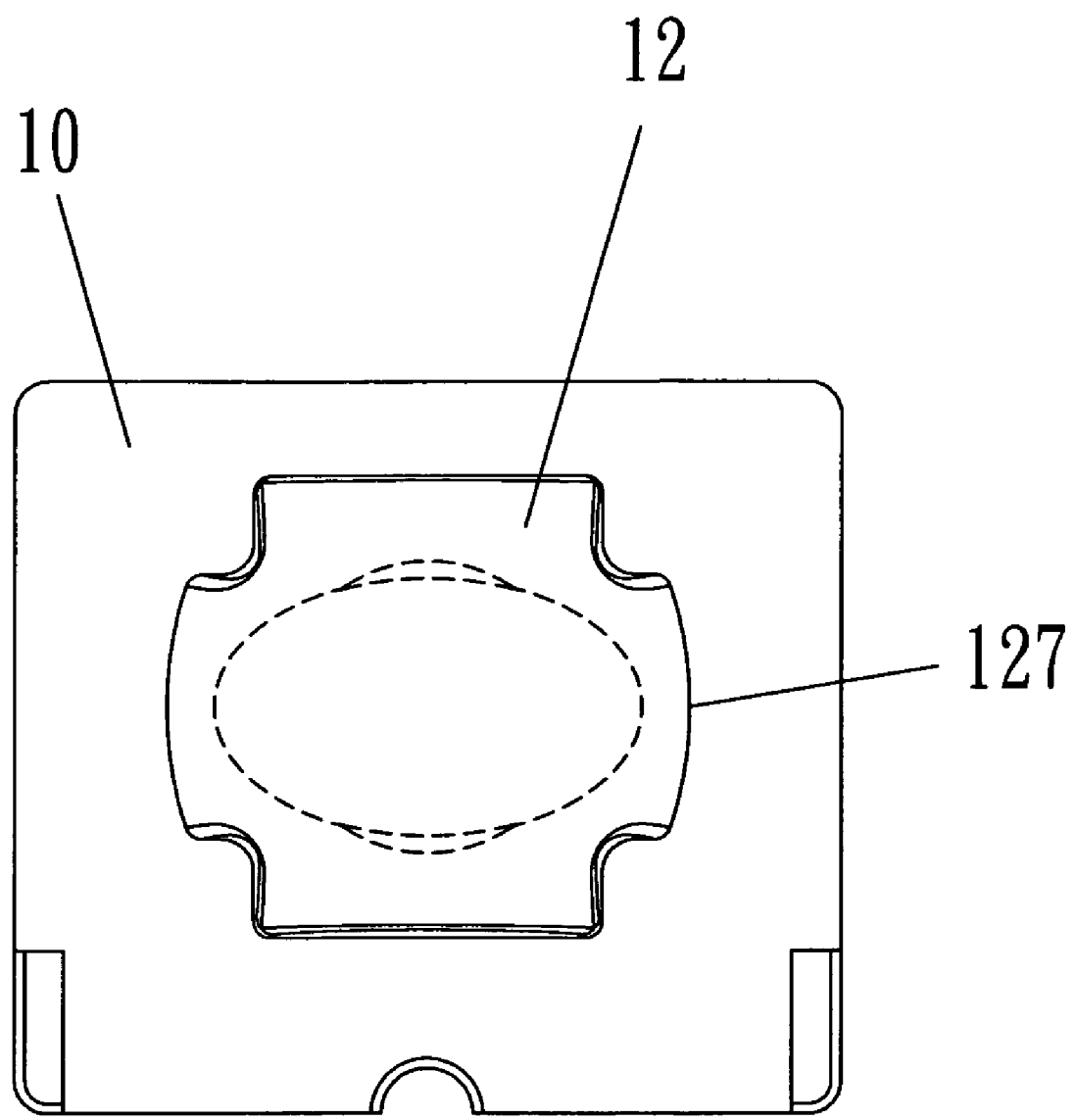
FIG. 18 is an elevational view of the fifth preferred embodiment of the present invention.

Referring to FIGS. 17 and 18, the front view of elevation view about the fifth embodiment of the LED illumination lens are illustrated, in that the outline of the curved surface of the transmission surface 12 is a square shape with a cut angle 127.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED illumination lens for producing an output light beam through a LED light source, comprising: a lens having an incident surface defining an inner surface and a transmission surface opposite to said incident surface at an outer surface thereof, wherein said incident surface is a concave curved surface and said transmission surface is a convex curved surface, wherein a shape of said incident surface is a part of a first elliptical surface and a shape of said transmission surface is a part of a second elliptical surface such that light emitted from the LED light source first enters said incident surface, then passes through said lens and emits through said transmission surface to produce the output light beam, thereby dispersed light emitted at an edge side of the LED light source is refracted to shift to fall within the output light beam while light emitted through a front side of the LED light source is dispersed through said incident surface and said transmission surface to produce the output light beam which is uniform in light intensity while having a long and rod like shape.

2. The Led illumination lens, as recited in claim 1, further comprising a first elliptical size which is a elliptical construction for said incident surface to define the curvature of said concave curved surface, wherein said first elliptical size are defined through a three-dimensional plane configuration in which an x1, a y1 and a z1 values are further defined, wherein x1 is a distance between two vertexes of a minor axis, y1 is a distance between two vertexes of a major axis and z1 is a distance between a focal point and a vertical vertex of said first elliptical size for said incident surface, wherein x1 is smaller than y1; and a second elliptical size which is a elliptical construction for said transmission surface to define the curvature of said convex curved surface, wherein said second elliptical size are defined through a three-dimensional plane configuration in which an x2, a y2 and a z2 values are further defined, wherein x2 is a distance between two vertexes of a minor axis, y2 is a distance between two vertexes of a major axis and z2 is a distance between a focal point and a vertical vertex of said first elliptical size for said transmission surface, wherein y2 is smaller than x2.

3. The LED illumination lens, as recited in claim 2, wherein x1 has a value between 4 mm and 8 mm and x2 has a value between 8 mm and 16 mm.

4. The LED illumination lens, as recited in claim 3, further comprising a platform connected to said lens in such a manner that said lens is supported into position through said platform; and an edge portion between said lens and said platform, wherein said edge portion further defines a transmission surface at said edge portion which is an elliptical surface, a rectangular surface, a square shape surface, a round surface or a rectangular surface having at least one cut corner at one corner, or a polygonal surface.

5. An LED illumination device for producing an output light beam, comprising:
a LED light source; and
a lens having an incident surface defining an inner surface and a transmission surface opposite to said incident surface at an outer surface thereof, wherein said incident surface is a concave curved surface and said transmission surface is a convex curved surface, wherein a shape of said incident surface is a part of a first elliptical surface and a shape of said transmission surface is a part of a second elliptical surface such that light emitted from said LED light source first enters said incident surface, then passes through said lens and emits through said transmission surface to produce the output light beam, thereby dispersed light emitted at an edge side of said LED light source is refracted to shift to fall within the output light beam while light emitted through a front side of said LED light source is dispersed through said incident surface and said transmission surface to produce the output light beam which is uniform in light intensity while having a long and rod like shape.

6. The Led illumination device, as recited in claim 5, wherein said lens further comprises a first elliptical size which is a elliptical construction for said incident surface to define the curvature of said concave curved surface, wherein said first elliptical size are defined through a three-dimensional plane configuration in which an x1, a y1 and a z1 values are further defined, wherein x1 is a distance between two vertexes of a minor axis, y1 is a distance between two vertexes of a major axis and z1 is a distance between a focal point and a vertical vertex of said first elliptical size for said incident surface, wherein x1 is smaller than y1; and a second elliptical size which is a elliptical construction for said transmission surface to define the curvature of said convex curved surface, wherein said second elliptical size are defined through a three-dimensional plane configuration in which an x2, a y2 and a z2 values are further defined, wherein x2 is a distance between two vertexes of a minor axis, y2 is a distance between two vertexes of a major axis and z2 is a distance between a focal point and a vertical vertex of said first elliptical size for said transmission surface, wherein y2 is smaller than x2.

7. The LED illumination device, as recited in claim 6, wherein x1 has a value between 4 mm and 8 mm and x2 has a value between 8 mm and 16 mm.

8. The LED illumination device, as recited in claim 5, further comprising a platform connected to said lens in such a manner that said lens is supported into position through said platform; and an edge portion between said lens and said platform, wherein said edge portion further defines a transmission surface at said edge portion which is an elliptical surface, a rectangular surface, a square shape surface, a round surface or a rectangular surface having at least one cut corner at one corner, or a polygonal surface.

9. A method of producing an output light beam through a LED illumination lens and a LED light source, comprising the step of:
   (a) enclosing the LED light source with the lens such that light emitted from the LED light source is guided to pass through the lens to produce the output light beam, wherein said lens has an incident surface defining an inner surface and a transmission surface opposite to said incident surface at an outer surface thereof, wherein said incident surface is a concave curved surface and said transmission surface is a convex curved surface, wherein a shape of said incident surface is a part of a first elliptical surface and a shape of said transmission surface is a part of a second elliptical surface such that light emitted from said LED light source first enters said incident surface, then passes through said lens and emits through said transmission surface to produce the output light beam;
   (b) refracting dispersed light emitted at an edge side of said LED light source and shifting the dispersed light to fall within the output light beam; and
   (c) dispersing light emitted through a front side of said LED light source through said incident surface and said transmission surface to produce the output light beam which is uniform in light intensity while having a long and rod like shape.

10. The Led illumination device, as recited in claim 9, wherein said lens further comprises a first elliptical size which is a elliptical construction for said incident surface to define the curvature of said concave curved surface, wherein said first elliptical size are defined through a three-dimensional plane configuration in which an x1, a y1 and a z1 values are further defined, wherein x1 is a distance between two vertexes of a minor axis, y1 is a distance between two vertexes of a major axis and z1 is a distance between a focal point and a vertical vertex of said first elliptical size for said incident surface, wherein x1 is smaller than y1; and a second elliptical size which is a elliptical construction for said transmission surface to define the curvature of said convex curved surface, wherein said second elliptical size are defined through a three-dimensional plane configuration in which an x2, a y2 and a z2 values are further defined, wherein x2 is a distance between two vertexes of a minor axis, y2 is a distance between two vertexes of a major axis and z2 is a distance between a focal point and a vertical vertex of said first elliptical size for said transmission surface, wherein y2 is smaller than x2.

11. The LED illumination lens, as recited in claim 10, wherein x1 has a value between 4 mm and 8 mm and x2 has a value between 8 mm and 16 mm.

12. The LED illumination lens, as recited in claim 11, further comprising a platform connected to said lens in such a manner that said lens is supported into position through said platform; and an edge portion between said lens and said platform, wherein said edge portion further defines a transmission surface at said edge portion which is an elliptical surface, a rectangular surface, a square shape surface, a round surface or a rectangular surface having at least one cut corner at one corner, or a polygonal surface.

* * * * *